United States Patent
Li et al.

(10) Patent No.: US 12,552,914 B2
(45) Date of Patent: Feb. 17, 2026

(54) SUBSTITUTED THIOLATE SALT MELT ADDITIVES

(71) Applicant: 3M INNOVATIVE PROPERTIES COMPANY, St. Paul, MN (US)

(72) Inventors: Fuming B. Li, Woodbury, MN (US); Duane D. Fansler, Dresser, WI (US); Anthony F. Schultz, Forest Lake, MN (US); John M. Brandner, St. Paul, MN (US); Nathan E. Schultz, Woodbury, MN (US); John M. Sebastian, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 868 days.

(21) Appl. No.: 17/795,022

(22) PCT Filed: Jan. 19, 2021

(86) PCT No.: PCT/IB2021/050382
§ 371 (c)(1),
(2) Date: Jul. 25, 2022

(87) PCT Pub. No.: WO2021/152422
PCT Pub. Date: Aug. 5, 2021

(65) Prior Publication Data
US 2023/0095033 A1 Mar. 30, 2023

Related U.S. Application Data

(60) Provisional application No. 62/966,235, filed on Jan. 27, 2020.

(51) Int. Cl.
| | |
|---|---|
| *C08K 5/46* | (2006.01) |
| *B01D 39/16* | (2006.01) |
| *C07D 249/12* | (2006.01) |
| *C07D 271/113* | (2006.01) |
| *C07D 285/125* | (2006.01) |
| *C08K 5/378* | (2006.01) |
| *D01D 5/098* | (2006.01) |
| *D01F 1/09* | (2006.01) |
| *D01F 6/06* | (2006.01) |
| *D04H 1/4291* | (2012.01) |
| *D04H 1/56* | (2006.01) |
| *D04H 3/007* | (2012.01) |
| *D04H 3/14* | (2012.01) |

(Continued)

(52) U.S. Cl.
CPC ............ *C08K 5/46* (2013.01); *B01D 39/1623* (2013.01); *C07D 249/12* (2013.01); *C07D 271/113* (2013.01); *C07D 285/125* (2013.01); *C08K 5/378* (2013.01); *D01D 5/0985* (2013.01); *D01F 1/09* (2013.01); *D01F 6/06* (2013.01); *D04H 1/4291* (2013.01); *D04H 1/56* (2013.01); *D04H 3/007* (2013.01); *D04H 3/14* (2013.01); *D06M 10/02* (2013.01); *A62B 23/02* (2013.01); *B01D 2239/0435* (2013.01); *B01D 2239/0618* (2013.01); *B01D 2239/0622* (2013.01); *B01D 2239/1233* (2013.01); *D06M 2101/20* (2013.01); *D10B 2321/022* (2013.01); *D10B 2505/04* (2013.01); *H04R 19/013* (2013.01); *H04R 19/016* (2013.01)

(58) Field of Classification Search
CPC ...... C08K 5/46; C08K 5/378; B01D 39/1623; B01D 2239/0435; B01D 2239/0618; B01D 2239/0622; B01D 2239/1233; B01D 2239/0478; B01D 2239/0627; B01D 2239/1291; B01D 39/1692; B01D 39/163; C07D 249/12; C07D 271/113; C07D 285/125; D01D 5/0985; D01F 1/09; D01F 6/06; D01F 1/10; D04H 1/4291; D04H 1/56; D04H 3/007; D04H 3/14; D04H 1/4326; D04H 1/435; D04H 1/4382; D06M 10/02; D06M 2101/20; A62B 23/02; D10B 2321/022; D10B 2505/04; H04R 19/013; H04R 19/016
See application file for complete search history.

(56) References Cited

U.S. PATENT DOCUMENTS

| | | | |
|---|---|---|---|
| 3,971,373 | A | 7/1976 | Braun |
| 4,100,324 | A | 7/1978 | Anderson et al. |

(Continued)

FOREIGN PATENT DOCUMENTS

| | | |
|---|---|---|
| EP | 0447166 B1 | 6/1996 |
| EP | 0623941 B1 | 8/1997 |

(Continued)

OTHER PUBLICATIONS

Davies, "The Separation of Airborne Dust and Particles", Proceedings of the Institution of Mechanical Engineers, Jun. 1953, vol. 167, No. 1B, pp. 185-213.

(Continued)

*Primary Examiner* — Doris L Lee
(74) *Attorney, Agent, or Firm* — Jeffrey M. Olofson

(57) ABSTRACT

Charged polymeric webs, such as electret webs, include a thermoplastic resin and a charge-enhancing additive. The additives are substituted heterocyclic thiolate salts. The heterocyclic thiolate salt has 2 nitrogen groups and a third group that may be an NH, N—NH$_2$, O, or S group. The substituent group is an aromatic or heterocyclic aromatic group. The electret webs may be a non-woven fibrous web or a film. The electret webs are suitable for use as filter media.

19 Claims, No Drawings

(51) Int. Cl.
  *D06M 10/02* (2006.01)
  *A62B 23/02* (2006.01)
  *D06M 101/20* (2006.01)
  *H04R 19/01* (2006.01)

(56) References Cited

U.S. PATENT DOCUMENTS

| | | | |
|---|---|---|---|
| 4,118,531 | A | 10/1978 | Hauser |
| 4,215,682 | A | 8/1980 | Kubik et al. |
| 4,264,750 | A | 4/1981 | Anand et al. |
| RE30,782 | E | 10/1981 | Van |
| 4,340,563 | A | 7/1982 | Appel et al. |
| 4,375,718 | A | 3/1983 | Wadsworth et al. |
| RE31,285 | E | 6/1983 | Van et al. |
| 4,429,001 | A | 1/1984 | Kolpin et al. |
| 4,508,781 | A | 4/1985 | Yagi et al. |
| 4,557,945 | A | 12/1985 | Yagi et al. |
| 4,588,537 | A | 5/1986 | Klaase et al. |
| RE32,171 | E | 6/1986 | Van |
| 4,592,815 | A | 6/1986 | Nakao |
| 4,652,282 | A | 3/1987 | Ohmori et al. |
| 4,789,504 | A | 12/1988 | Ohmori et al. |
| 4,874,659 | A | 10/1989 | Ando et al. |
| 5,057,710 | A | 10/1991 | Nishiura et al. |
| 5,401,446 | A | 3/1995 | Tsai et al. |
| 5,496,507 | A | 3/1996 | Angadjivand et al. |
| 5,871,845 | A | 2/1999 | Dahringer et al. |
| 5,908,598 | A | 6/1999 | Rousseau et al. |
| 5,914,186 | A | 6/1999 | Yau et al. |
| 5,919,847 | A | 7/1999 | Rousseau et al. |
| 5,968,635 | A | 10/1999 | Rousseau et al. |
| 5,976,208 | A | 11/1999 | Rousseau et al. |
| 6,213,122 | B1 | 4/2001 | Rousseau et al. |
| 6,214,094 | B1 | 4/2001 | Rousseau et al. |
| 6,238,466 | B1 | 5/2001 | Rousseau et al. |
| 6,268,495 | B1 | 7/2001 | Rousseau et al. |
| 6,365,088 | B1 | 4/2002 | Knight et al. |
| 6,375,886 | B1 | 4/2002 | Angadjivand et al. |
| 6,397,458 | B1 | 6/2002 | Jones et al. |
| 6,398,847 | B1 | 6/2002 | Jones et al. |
| 6,406,657 | B1 | 6/2002 | Eitzman et al. |
| 6,409,806 | B1 | 6/2002 | Jones et al. |
| 6,419,871 | B1 | 7/2002 | Ogale |
| 6,432,175 | B1 | 8/2002 | Jones et al. |
| 6,454,986 | B1 | 9/2002 | Eitzman et al. |
| 6,524,488 | B1 | 2/2003 | Insley et al. |
| 6,562,112 | B2 | 5/2003 | Jones et al. |
| 6,743,464 | B1 | 6/2004 | Insley et al. |
| 6,808,551 | B2 | 10/2004 | Jones et al. |
| 6,824,718 | B2 | 11/2004 | Eitzman et al. |
| 7,244,291 | B2 | 7/2007 | Spartz et al. |
| 7,244,292 | B2 | 7/2007 | Kirk et al. |
| 7,390,351 | B2 | 6/2008 | Leir et al. |
| 7,765,698 | B2 | 8/2010 | Sebastian et al. |
| 8,162,153 | B2 | 4/2012 | Fox et al. |
| 9,815,068 | B2 | 11/2017 | Schultz et al. |
| 10,240,269 | B2 | 3/2019 | Schultz et al. |
| 2002/0174869 | A1 | 11/2002 | Gahan et al. |
| 2003/0134515 | A1 | 7/2003 | David et al. |
| 2008/0038976 | A1 | 2/2008 | Berrigan et al. |
| 2015/0014030 | A1* | 1/2015 | Mitamura ............... B32B 27/30 524/106 |

FOREIGN PATENT DOCUMENTS

| | | | |
|---|---|---|---|
| EP | 0615007 | B1 | 2/2004 |
| JP | 06254319 | A | 9/1994 |
| JP | 08284063 | A | 10/1996 |
| WO | 199314510 | W | 7/1993 |
| WO | 200107144 | A1 | 2/2001 |
| WO | 2009076064 | A1 | 6/2009 |
| WO | 2009148744 | A2 | 12/2009 |
| WO | 2009148747 | A2 | 12/2009 |
| WO | WO-2014105107 | A1 * | 7/2014 ......... D04H 1/43838 |
| WO | 2015199972 | A1 | 12/2015 |
| WO | 2017007675 | A1 | 1/2017 |
| WO | 2018127831 | A1 | 7/2018 |
| WO | 2021152426 | A1 | 8/2021 |

OTHER PUBLICATIONS

International Search Report for PCT International Application No. PCT/IB2021/050382, mailed on Apr. 7, 2021, 4 pages.

Wente, "Manufacture of Superfine Organic Fibers" Naval Research Laboratories Report No. 4364 (111437), May 1954, 19 pages.

Wente, "Superfine Thermoplastic Fibers", Industrial and Engineering Chemistry, Aug. 1956, vol. 48, No. 8, pp. 1342-1346.

* cited by examiner

SUBSTITUTED THIOLATE SALT MELT ADDITIVES

FIELD OF THE DISCLOSURE

This disclosure relates to electret webs, including non-woven fibrous webs such as non-woven thermoplastic microfiber webs, containing charge-enhancing additives and uses thereof.

BACKGROUND

An electret is a dielectric material that exhibits a quasi-permanent electrical charge. Electrets are useful in a variety of devices including, e.g. cling films, air filters, filtering facepieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a corona discharge or imparting a charge to the fiber mat by means of carding and/or needle tacking (tribocharging). In addition, a method in which jets of water or a stream of water droplets impinge on a nonwoven web at a pressure sufficient to provide filtration enhancing electret charge has also been described (hydrocharging).

A number of materials have been added to polymeric compositions to modify the properties of the polymeric composition. For example, in U.S. Pat. No. 5,914,186 (Yau et al.), heat-resistant anti-static pressure sensitive adhesive tapes are described that comprise a substrate coated with a microparticle adhesive having a diameter of at least 1 micrometer. The microparticles have a conductive coating formed from a polymer electrolyte base polymer, at least one ionic salt of an alkali or alkaline earth metal, and at least one thermal stabilizer selected from the group consisting of hindered amines, salts of substituted toluimidazoles, and mixtures thereof.

A variety of charge-enhancing additives have been developed for use in electret materials. U.S. Pat. No. 9,815,068 describes electret webs that include a thermoplastic resin and a charge-enhancing additive, where the charge-enhancing additive is a divalent metal-containing substituted-mercaptobenzimidazolate salt. U.S. Pat. No. 10,240,269 describes electret webs include a thermoplastic resin and a charge-enhancing additive, where the charge-enhancing additive is a fused aromatic thiourea, a fused aromatic urea compound, or a combination thereof. The change-enhancing additive may also include a hindered amine light stabilizer compound.

Examples of electrets that have additives added include electrets with antibacterial additives as described in Japanese Patent Publication JP 08284063 which describes N-n-butylcarbamic acid 3-9 iodo-2-propynyl ester containing either an amidine or guanidine group, and 2-(4-thiazolyl) benzimidazole, and PCT Publication WO 93/14510 which describes hindered amine compounds, nitrogenous hindered phenol compounds, metallic salt hindered phenol compounds, phenol compounds, sulfur compounds, and phosphorous compounds. Japanese Patent Publication JP 06254319 describes the use of metal salts of long chain organic acids in polyolefin electrets to lessen the attenuation of the electrification quantity. European Patent Publication No. EP 623,941 describes the use of Charge Control Agents from various chemical classes in polymer electrets.

Also described are processes for producing high stability electrets, such as European Patent Publication No. EP 447,166 which describes a process for producing electrets comprising alternating at least two cycles of applying electric charge and subsequently heating, and also describes electrets containing polar high-molecular weight compounds, and U.S. Pat. No. 4,874,659 (Ando et al.) which describes a process comprising placing a fiber sheet between a non-contact voltage-applied electrode and an earth electrode and supplying electricity between the electrodes.

SUMMARY

This disclosure relates to electret webs, including non-woven fibrous webs such as non-woven thermoplastic microfiber webs, containing charge-enhancing additives and uses thereof. Among the uses are electret filter media.

In some embodiments, the electret web comprises a thermoplastic resin, and a charge-enhancing additive comprising a substituted heterocyclic thiolate salt with the general structure of Formula 3:

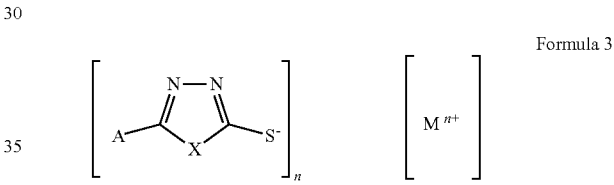

Formula 3 where X comprises an NH, N—$NH_2$, O, or S group, and A comprises an aromatic or heterocyclic aromatic group of the general Formula 2:

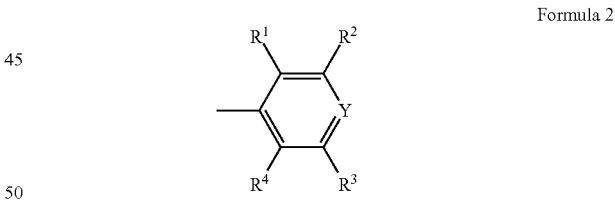

Formula 2 where $R^1$, $R^2$, $R^3$, and $R^4$ independently comprise a hydrogen atom, an alkyl, an aryl, an alkoxy, or a substituted alkyl, and Y is a C—$R^5$ group or a nitrogen atom, where $R^5$ is a hydrogen atom, an alkyl, an aryl, an alkoxy, or a substituted alkyl group.

DETAILED DESCRIPTION

The need remains for electret webs with improved properties. Presented in this disclosure are electret webs containing charge-enhancing additives. These charge-enhancing additives provide electret webs that are easy to charge by a variety of different charging mechanisms such as tribocharging, corona discharge, hydrocharging or a combination thereof. In some embodiments, the electret webs of this disclosure are capable of being charged by corona discharge alone, particularly DC corona discharge, without the need for additional charging mechanisms.

Electret webs useful in the present disclosure include a blend of a thermoplastic resin and a charge-enhancing additive. Webs prepared from such blends can show enhanced properties over webs prepared with the thermoplastic resins alone. Useful charge-enhancing additives include a substituted heterocyclic thiolate metal salts.

The electret webs may be in a variety of forms. For example, the web may be a continuous or discontinuous film, or a fibrous web. Fibrous webs are particularly useful for the formation of filtration medium. In some embodiments the web is a non-woven microfibrous web. Typically, microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term "electret" refers to a material that exhibits a quasi-permanent electric charge.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as —CH$_2$CH$_2$(OCH$_2$CH$_2$)$_n$OCH$_2$CH$_3$.

The term "alkoxy" refers to a group of the type —OR, where R is an alkyl, substituted alkyl, aryl, or aralkyl group.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The terms "mercaptan" and "thiol" are used interchangeably herein and refer to a terminal —SH group. Thiolate salts are those in which the H group of the thiol group is replaced by a metal ion ([—S$^-$][M$^+$]).

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Thermoplastic resins useful in the present disclosure include any thermoplastic nonconductive polymer capable of retaining a high quantity of trapped electrostatic charge when formed into a web and charged. Typically, such resins have a DC (direct current) resistivity of greater than 10$^{14}$ ohm-cm at the temperature of intended use. Polymers capable of acquiring a trapped charge include polyolefins such as polypropylene, polyethylene, and poly-4-methyl-1-pentene; polyvinyl chloride; polystyrene; polycarbonates; polyesters, including polylactides; and perfluorinated polymers and copolymers. Particularly useful materials include polypropylene, poly-4-methyl-1-pentene, blends thereof or copolymers formed from at least one of propylene and 4-methyl-1-pentene.

Examples of suitable thermoplastic resins include, for example, the polypropylene resins: ESCORENE PP 3746G commercially available from Exxon-Mobil Corporation, Irving, TX; TOTAL PP3960, TOTAL PP3860, and TOTAL PP3868 commercially available from Total Petrochemicals USA Inc., Houston, TX; and METOCENE MF 650 W commercially available from LyondellBasell Industries, Inc., Rotterdam, Netherlands; and the poly-4-methyl-1-pentene resin TPX-MX002 commercially available from Mitsui Chemicals, Inc., Tokyo, Japan.

The charge-enhancing additives are substituted heterocyclic thiolate metal salts. These compounds are prepared from substituted heterocyclic thiols. These substituted heterocyclic thiols can themselves be charge-enhancing agents as described in copending application "Electret Webs with Charge-enhancing Additives" 62/966,205 which was filed on the same day as the current disclosure. The substituted heterocyclic thiols can be described by the general structure of Formula 1 shown below:

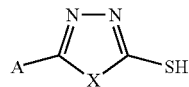

Formula 1 wherein X comprises an NH, N—NH$_2$, O, or S group; and
A comprises an aromatic or heterocyclic aromatic group.

The aromatic or heterocyclic aromatic group A can be described by the general Formula 2 below:

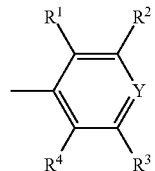

Formula 2

Wherein R$^1$, R$^2$, R$^3$, and R$^4$ independently comprise a hydrogen atom, an alkyl, an aryl, an alkoxy, or a substituted alkyl; and Y is a C—R⁵ group or a nitrogen atom, where $R^5$ is a hydrogen atom, an alkyl, an aryl, an alkoxy, or a substituted alkyl group.

In some embodiments, the charge-enhancing additive has the structure of Formula 1A below. This structure is of general Formula 1 wherein X is an —NH group and the A group is of general Formula 2, wherein Y comprises a —C—R⁵ group, wherein $R^5$ comprises a hydrogen atom; and each $R^1$, $R^2$, $R^3$, and $R^4$ comprises a hydrogen atom.

In some embodiments, the charge-enhancing additive has the structure of Formula 1B below. This structure is of general Formula 1 wherein X is an —N—NH₂ group and the A group is of general Formula 2, wherein Y comprises a —C—R⁵ group, wherein $R^5$ comprises a hydrogen atom; and each $R^1$, $R^2$, $R^3$, and $R^4$ comprises a hydrogen atom.

In other embodiments, the charge-enhancing additive has the structure of Formula 1C below. This structure is of general Formula 1 wherein X is an —NH group and the A group is of general Formula 2, wherein Y comprises an N group; and each $R^1$, $R^2$, $R^3$, and $R^4$ comprises a hydrogen atom.

In some embodiments, the charge-enhancing additive has the structure of Formula 1D below. This structure is of general Formula 1 wherein X is an O group and the A group is of general Formula 2, wherein Y comprises a —C—R⁵ group, wherein $R^5$ comprises an alkyl group, in this case a methyl group; and each $R^1$, $R^2$, $R^3$, and $R^4$ comprises a hydrogen atom.

In some embodiments, the charge-enhancing additive has the structure of Formula 1E below. This structure is of general Formula 1 wherein X is an S group and the A group is of general Formula 2, wherein Y comprises a —C—R⁵ group, wherein $R^5$ comprises a hydrogen atom; and each $R^1$, $R^2$, $R^3$, and $R^4$ comprises a hydrogen atom.

Some particularly suitable examples of compounds of Formula 1 that have been described above, are shown below as Formula 1A, 1B, 1C, 1D, and 1E below:

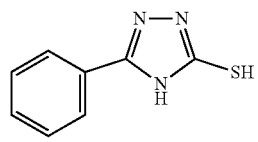

Formula 1A

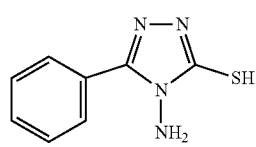

Formula 1B

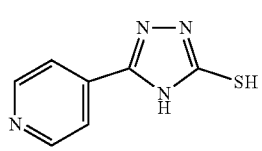

Formula 1C

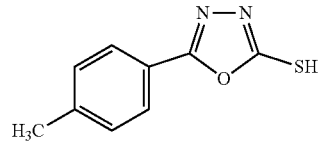

Formula 1D

Formula 1E

These substituted heterocyclic thiol compounds can be turned into metal salts through a salt metathesis reaction with a metal salt, where the proton on the mercapto group is exchanged for a metal cation. This salt metathesis reaction is outlined below in Reaction Scheme 1:

Reaction Scheme 1

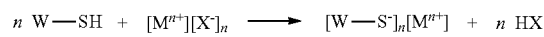

$n$ W—SH + [M$^{n+}$][X⁻]$_n$ ⟶ [W—S⁻]$_n$[M$^{n+}$] + $n$ HX

In Reaction Scheme 1: W—SH is a substituted heterocyclic thiol compound of Formula 1 where W is the substituted heterocyclic segment of the substituted heterocyclic thiol compounds; M is a metal cation with a valence of n; X is a counteranion; n is an integer of 1-3.

A wide range of metal salts [M$^{n+}$][X⁻]$_n$ are suitable for use in Reaction Scheme 1. Typically, the metal cation is monovalent, divalent, or trivalent. Examples of metal ions include: the monovalent ions Li⁺, Na⁺, and K⁺; the divalent ions Ca²⁺, Zn²⁺, Mg²⁺; the trivalent ion Al³⁺; or transition metal ions. A wide range of anionic groups are suitable. Particularly suitable anions include acetate (CH₃CO₂⁻), nitrate, sulfate, carbonate, or phosphate.

Typically, the salt metathesis reaction is carried out in a liquid medium such as a solvent. A wide range of solvents are suitable, generally polar solvents to facilitate the dissolution of the ionic species. Examples of polar solvents include: ethers such as THF (tetrahydrofuran) or diethyl ether; ketones such acetone or MEK (methyl ethyl ketone); acetates such as ethyl acetate; alcohols such as methanol, ethanol, 1-propanol, 2-propanol; and blends or combinations of solvents or blends with water.

The metal salt compounds formed in Reaction Scheme 1 include salts of general formula 3 below:

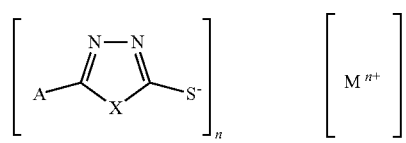

Formula 3 wherein X comprises an NH, N—NH₂, O, or S group; and A comprises an aromatic or heterocyclic aromatic group.

The aromatic or heterocyclic aromatic group A can be described by the general Formula 2 below:

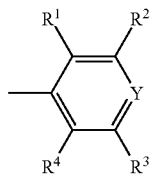

Formula 2

Wherein $R^1$, $R^2$, $R^3$, and $R^4$ independently comprise a hydrogen atom, an alkyl, an aryl, an alkoxy, or a substituted alkyl; and Y is a C—$R^5$ group or a nitrogen atom, where $R^5$ is a hydrogen atom, an alkyl, an aryl, an alkoxy, or a substituted alkyl group.

In some embodiments, the metal salt of Formula 3 are the zinc salts described by Formulas 3A, 3B, and 3C below.

The salt of Formula 3A is of general Formula 3, where X is an NH group; and the group A is of general Formula 2, wherein each $R^1$, $R^2$, $R^3$, and $R^4$ independently is a hydrogen atom; and Y is a C—$R^5$ group, where $R^5$ is a hydrogen atom; M is Zn; and n is 2.

The salt of Formula 3B is of general Formula 3, where X is an O group; and the group A is of general Formula 2, wherein each $R^1$, $R^2$, $R^3$, and $R^4$ independently is a hydrogen atom; and Y is a C—$R^5$ group, where $R^5$ is an alkyl group, in this case a methyl group; M is Zn; and n is 2.

The salt of Formula 3C is of general Formula 3, where X is an S group; and the group A is of general Formula 2, wherein each $R^1$, $R^2$, $R^3$, and $R^4$ independently is a hydrogen atom; and Y is a C—$R^5$ group, where $R^5$ is a hydrogen atom; M is Zn; and n is 2.

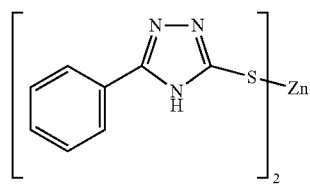

Formula 3A

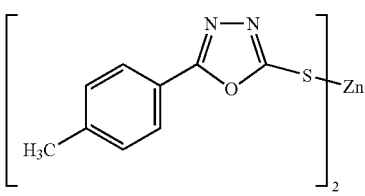

Formula 3B

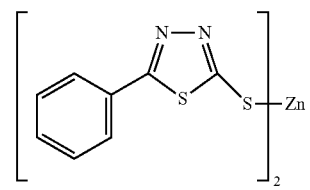

Formula 3C

Combinations of charging additives of general Formula 1 may also be used.

The charge-enhancing additive can be added in any suitable amount. The charge-enhancing additives of this disclosure have been shown to be effective even in relatively small quantities. Typically, the charge-enhancing additive is present in a thermoplastic resin and charge-enhancing additive blend in amounts of up to about 10% by weight, more typically in the range of 0.02 to 5% by weight based upon the total weight of the blend. In some embodiments, the charge-enhancing additive is present in an amount ranging from 0.1 to 3% by weight, 0.1 to 2% by weight, 0.2 to 1.0% by weight, or 0.25 to 0.5% by weight.

The blend of the thermoplastic resin and the charge-enhancing additive can be prepared by well-known methods. Typically, the blend is processed using melt extrusion techniques, so the blend may be preblended to form pellets in a batch process, or the thermoplastic resin and the charge-enhancing additive may be mixed in the extruder in a continuous process. Where a continuous process is used, the thermoplastic resin and the charge-enhancing additive may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e. g. a BRABENDER PREP CENTER, commercially available from C.W. Brabender Instruments, Inc.; South Hackensack, NJ) or BANBURY internal mixing and roll milling equipment (e.g. equipment available from Farrel Co.; Ansonia, CT). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the additive.

The extruded blend of thermoplastic resin and charge-enhancing additive may be cast or coated into films or sheets or may be formed into a fibrous web using any suitable techniques. Films can be made into a variety of articles including filtration media by the methods described in, for example, U.S. Pat. No. 6,524,488 (Insley et al.). Fibrous webs can be made from a variety of fiber types including, for example, melt-blown microfibers, staple fibers, fibrillated films, and combinations thereof. Techniques for preparing fibrous webs include, for example, air laid processes, wet laid processes, hydro-entanglement, spunbond processes, melt-blown processes, and combinations thereof. Melt-blown and spunbond, non-woven microfibrous webs are particularly useful as filtration media.

Melt-blown and spunbond, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Spunbond microfibers may be formed using a spunbond process in which one or more continuous polymeric free-fibers are extruded onto a collector, as described, for example, in U.S. Pat. Nos. 4,340,563 and 8,162,153 and US Patent Publication No. 2008/0038976.

Useful melt-blown and spunbond microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a loftier, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, nucleating agents, primary and secondary antioxidants, metal deactivators, hindered amines, hindered phenols, fatty acid metal salts, triester phosphites, phosphoric acid salts, fluorine-containing compounds and combinations thereof. Particularly suitable additives include HALS (Hindered Amine Light Stabilizers) and antioxidants, as these may also act as charge-enhancing additives. In addition, other charge-enhancing additives may be combined with the thermoplastic composition. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944: (poly[[6-(1,1,3,3,-tetramethylbutyl) amino]-s-triazine-2,4-diyl][[(2,2,6,6-tetramethyl-4-piperidyl) imino] hexamethylene [(2,2,6,6-tetramethyl-4-piperidyl) imino]]), available from BASF, Ludwigshafen, Germany. The charge-enhancing additives may be N-substituted amino aromatic compounds, particularly tri-amino substituted compounds, such as 2,4,6-trianilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition, the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pat. Nos. 6,397,458, 6,398,847, 6,409,806, 6,432,175, 6,562, 112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally, the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed, or the web may be charged after the web is formed. In electret filter medium, the medium is generally charged after the web is formed. In general, any standard charging method known in the art may be used. For example, charging may be carried out in a variety of ways, including tribocharging, corona discharge and hydrocharging. A combination of methods may also be used. As mentioned above, in some embodiments, the electret webs of this disclosure have the desirable feature of being capable of being charged by corona discharge alone, particularly DC corona discharge, without the need of additional charging methods.

Examples of suitable corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), and U.S. Pat. No. 6,365,088 (Knight et al.).

Another technique that can be used to charge the electret web is hydrocharging. Hydrocharging of the web is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the method disclosed in the U.S. Pat. No. 7,765,698 (Sebastian et al.).

To assess filtration performance, a variety of filtration testing protocols has been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web ($\Delta P$). From these two measurements, a quantity known as the Quality Factor (QF) may be calculated by the following equation:

$$QF = -\ln(\% \text{ Pen}/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration medium of this disclosure has measured QF values of 0.3 (mm of $H_2O)^{-1}$ or greater at a face velocity of 6.9 centimeters per second.

EXAMPLES

This disclosure describes electret filter media that comprises a fibrous web. The electric webs include a thermoplastic resin such as polypropylene (PP) and melt processable charge-enhancing additive compositions. The melt additive compositions comprise at least one component or mixtures of the additives in Table-1.

Charge Additives and Polypropylene (PP) Resin

The additives used in this invention are commercially available or synthesized at 3M. The detailed information about each additive is tabulated in Table-1. The PP resin used in this invention for making webs is commercially available and was primarily used as received from the vendor.

TABLE 1

Polypropylene Resins, Chemical Regent and Charging Additives Information

| Material No. | Code Name | Chemical Structure | Description and Company |
|---|---|---|---|
| 1 | CA-1 | | CAS: 3414-94-6<br>5-Phenyl-1H-1,2,4-triazole-3-thiol<br>Oakwood Chemical, Estill, NC |
| 2 | CA-2 | | CAS: 22706-11-2<br>4-Amino-5-phenyl-4H-1,2,4-triazole-3-thiol<br>Sigma Aldrich |
| 3 | CA-3 | | CAS: 32362-88-2<br>5-(3-Pyridyl)-4H-1,2,4-triazole-3-thiol<br>Sigma Aldrich |
| 4 | CA-4 | | CAS: 31130-15-1<br>5-(4-Methylphenyl)-1,3,4-oxadiazole-2-thiol<br>Oakwood Chemical, Estill, NC |

TABLE 1-continued

Polypropylene Resins, Chemical Regent and Charging Additives Information

| Material No. | Code Name | Chemical Structure | Description and Company |
|---|---|---|---|
| 5 | CA-5 | 5-phenyl-1,3,4-thiadiazole-2-thiol (phenyl-thiadiazole with SH group) | CAS: 5585-19-3<br>5-Phenyl-1,3,4-thiadiazole-2-thiol<br>Life Chemicals, Kyiv, Ukraine |
| 6 | CA-6 | [phenyl-1,2,4-triazole-3-thiolate]$_2$Zn (NH in ring) | Synthesized as described below |
| 7 | CA-7 | [5-(4-methylphenyl)-1,3,4-oxadiazole-2-thiolate]$_2$Zn | Synthesized as described below |
| 8 | CA-8 | [5-phenyl-1,3,4-thiadiazole-2-thiolate]$_2$Zn | Synthesized as described below |
| 9 | PP-1 | Polyproplyne PP650X | Melt Flow Index (MFI): 1200; LyondellBasell, TX |
| 10 | PP-2 | Polyproplyne PP650W | Melt Flow Index (MFI): 800; LyondellBasell, TX |
| 11 | Zn(OAc)$_2$ | $C_4H_6O_4Zn \cdot 2H_2O$ | CAS: 5970-45-6<br>Zinc Acetate Dihydrate<br>Alfa Aesar |

Mercaptan Zinc Metal Compounds Synthesis

The mercaptan compound, labelled CA-1, CA-4 & CA-5 in Table-1 and zinc acetate dihydrate were weighed and added to a 32 oz. glass jar to synthesize additives CA-6, CA-7 & CA-8 according to Table 2. Tetrahydrofuran (EMD Millipore, Darmstadt, DE) was added to the jar until it was ¾ full, approximately 150 g. A magnetic stir bar was added, and the jar was capped. The reaction could continue for 16 hr at ambient conditions before the solution was placed in a large evaporation dish and heated at 125° C. for 4 hours. The reaction product was confirmed by $^1$H NMR, as well as the dryness of the product via loss of the acetic acid peak.

TABLE 2

Synthesized Metal compounds from Mercaptan and Zinc Acetate

| Synthesized Chemical Code | Synthesized Chemical Structure | Starting Chemical RSH | Amount of RSH (g) | Amount of Zn(OAc)$_2$ (g) | Yield Complex (g) |
|---|---|---|---|---|---|
| CA-6 | [phenyl-1,2,4-triazole-3-thiolate]$_2$Zn (NH in ring) | CA-1 | 7.33 | 5 | 8.74 |

TABLE 2-continued

Synthesized Metal compounds from Mercaptan and Zinc Acetate

| Synthesized Chemical Code | Synthesized Chemical Structure | Starting Chemical RSH | Amount of RSH (g) | Amount of $Zn(OAc)_2$ (g) | Yield Complex (g) |
|---|---|---|---|---|---|
| CA-7 | [structure: 5-(4-methylphenyl)-1,3,4-oxadiazole-2-thiolate zinc complex] | CA-4 | 15.91 | 10 | 17.26 |
| CA-8 | [structure: 5-phenyl-1,3,4-thiadiazole-2-thiolate zinc complex] | CA-5 | 3.22 | 2 | 3.37 |

Step-A: Preparation of Melt-Blown Microfiber (BMF) Webs:

Extrusion was performed generally as described in Van A. Wente, *Superfine Thermoplastic Fibers*, 48 INDUST. ENGN. CHEM., 1342-46 and Naval Research Laboratory Report 111437 (Apr. 15, 1954) via the extrusion method of using an extruder operating at a temperature of about 220° C. to 330° C. connected to a melt blowing die having 10 holes per centimeter (25 holes per inch) and 0.38 mm (0.015 in) diameter holes, BMF webs were formed having basis weights of about 45-70 g/m², effective fiber diameters of about 6.5-10 micrometers, solidities of about 4-10%, and thicknesses of about 0.6-2.5 millimeters. Charging additives were fed directly into the extruder with the resin, either as dry powder or as the compounds containing 10-30 wt % additive concentrates. Table-3 summarizes the specific web characteristics and concentration(s) of charging additives for each of the Examples and Comparative Examples.

TABLE 3

The Compositions and Specific Characteristics of BMF Webs samples

| | Web Compositions | | | | | |
|---|---|---|---|---|---|---|
| Web No. | PP | Additive | Additive C % (wt) | Basis Weight (GSM) | Solidity (%) | EFD (μm) |
| 1 | PP-1 | None | 0.00 | 63.0 | 7.7 | 11.3 |
| 2 | PP-1 | None | 0.00 | 56.6 | 6.0 | 8.4 |
| 3 | PP-2 | None | 0.00 | 54.4 | 6.2 | 8.4 |
| 4 | PP-1 | CA-1 | 0.10 | 55.1 | 6.2 | 8.1 |
| 5 | PP-1 | CA-1 | 0.30 | 55.1 | 6.1 | 8.2 |
| 6 | PP-1 | CA-2 | 0.10 | 55.1 | 6.1 | 8.1 |
| 7 | PP-1 | CA-2 | 0.30 | 55.1 | 6.1 | 8.2 |
| 8 | PP-2 | CA-3 | 0.20 | 53.0 | 6.5 | 8.3 |
| 9 | PP-1 | CA-4 | 0.20 | 59.4 | 7.1 | 11.8 |
| 10 | PP-1 | CA-5 | 0.15 | 55.1 | 6.6 | 8.2 |
| 11 | PP-1 | CA-6 | 0.1 | 55.8 | 6.4 | 7.9 |
| 12 | PP-1 | CA-6 | 0.2 | 55.1 | 6.1 | 8.0 |
| 13 | PP-1 | CA-7 | 0.1 | 55.1 | 6.1 | 8.1 |
| 14 | PP-1 | CA-7 | 0.2 | 55.1 | 6.1 | 7.9 |
| 15 | PP-1 | CA-8 | 0.15 | 55.1 | 6.3 | 7.9 |

Step B—Electret Preparation:

Samples of each BMF web prepared in Step A above were charged by the following two charging methods and procedures. The designated charging method applied to each of comparative examples and examples are tabulated in Table-4

Charging Method 1—Corona Charging:

The selected melt-blown webs prepared above were charged by DC corona discharge. The corona charging was accomplished by passing the web on a grounded surface under a corona wire source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage.

Likewise, for each Comparative Example, a melt-blown web was prepared from the same grade of polypropylene as the corresponding Examples web, but no charge additive was added.

Charging Method 2—Corona Pre-Treatment and Hydrocharging:

The selected melt-blown webs prepared in Step A above were pretreated by DC corona discharge as described in Charging Method 1 and then charged by hydrocharging as described in the following procedure:

A fine spray of high purity water having a conductivity of less than 5 microS/cm was continuously generated from a nozzle operating at a pressure of 896 kiloPascals (130 psig) and a flow rate of approximately 1.4 liters/minute. The selected melt-blown webs prepared in Step A were conveyed by a porous belt through the water spray at a speed of approximately 10 centimeters/second while a vacuum simultaneously drew the water through the web from below. Each melt-blown web was run through the hydrocharger twice (sequentially once on each side) and then allowed to dry completely overnight prior to filter testing.

Filtration Results of Example E1-E24 and Comparative Example C1-C8

For each Comparative Example, a blown microfiber (BMF) nonwoven web was extruded using the polymeric resin listed in the Table-1.

For each Example, the extruded blown microfiber (BMF) nonwoven web comprises the polypropylene resin listed in the Table-1 and one of the charging additives or a combination thereof listed in the Table-1.

The comparative examples and examples were charged either by the charging method-1 or the charging method-2. The quality factors (QFs) & charge retention are listed in the Table-4.

TABLE 4

Electret media Examples and Comparative Examples

| Ex. No. | Web No. | Resin Code | Charging Additive Code | Concentration (wt %) | $Q_0$ | $Q_3$ | $Q_3/Q_0$ | Charging Method |
|---|---|---|---|---|---|---|---|---|
| C-1 | 1 | PP-1 | None | 0.00 | 0.28 | 0.21 | 0.78 | 1 |
| E-1 | 9 | PP-1 | CA-4 | 0.20 | 0.35 | 0.26 | 0.75 | 1 |
| C-2 | 2 | PP-1 | None | 0.00 | 0.18 | 0.16 | 0.87 | 1 |
| E-2 | 4 | PP-1 | CA-1 | 0.10 | 0.29 | 0.26 | 0.87 | 1 |
| E-3 | 5 | PP-1 | CA-1 | 0.30 | 0.28 | 0.24 | 0.87 | 1 |
| E-4 | 6 | PP-1 | CA-2 | 0.10 | 0.27 | 0.26 | 0.94 | 1 |
| E-5 | 7 | PP-1 | CA-2 | 0.30 | 0.29 | 0.28 | 0.97 | 1 |
| E-6 | 10 | PP-1 | CA-5 | 0.15 | 0.26 | 0.22 | 0.83 | 1 |
| C-3 | 3 | PP-2 | None | 0.00 | 0.23 | 0.13 | 0.55 | 1 |
| E-7 | 8 | PP-2 | CA-3 | 0.20 | 0.30 | 0.24 | 0.80 | 1 |
| C-4 | 1 | PP-1 | None | 0.00 | 0.39 | 0.29 | 0.73 | 2 |
| E-8 | 9 | PP-1 | CA-4 | 0.20 | 0.54 | 0.41 | 0.75 | 2 |
| C-5 | 2 | PP-1 | None | 0.00 | 0.44 | 0.41 | 0.93 | 2 |
| E-9 | 4 | PP-1 | CA-1 | 0.10 | 0.58 | 0.55 | 0.95 | 2 |
| E-10 | 5 | PP-1 | CA-1 | 0.30 | 0.58 | 0.61 | 1.04 | 2 |
| E-11 | 6 | PP-1 | CA-2 | 0.10 | 0.52 | 0.50 | 0.97 | 2 |
| E-12 | 7 | PP-1 | CA-2 | 0.30 | 0.50 | 0.55 | 1.11 | 2 |
| E-13 | 10 | PP-1 | CA-5 | 0.15 | 0.47 | 0.38 | 0.80 | 2 |
| C-6 | 3 | PP-2 | None | 0.00 | 0.40 | 0.27 | 0.68 | 2 |
| E-14 | 8 | PP-2 | CA-3 | 0.20 | 0.51 | 0.53 | 1.04 | 2 |
| C-7 | 2 | PP-1 | None | 0.00 | 0.18 | 0.16 | 0.87 | 1 |
| E-15 | 11 | PP-1 | CA-6 | 0.10 | 0.27 | 0.25 | 0.94 | 1 |
| E-16 | 12 | PP-1 | CA-6 | 0.20 | 0.32 | 0.28 | 0.89 | 1 |
| E-17 | 13 | PP-1 | CA-7 | 0.10 | 0.28 | 0.23 | 0.82 | 1 |
| E-18 | 14 | PP-1 | CA-7 | 0.20 | 0.30 | 0.25 | 0.85 | 1 |
| E-19 | 15 | PP-1 | CA-8 | 0.15 | 0.36 | 0.30 | 0.86 | 1 |
| C-8 | 2 | PP-1 | None | 0.00 | 0.44 | 0.41 | 0.93 | 2 |
| E-20 | 11 | PP-1 | CA-6 | 0.10 | 0.59 | 0.51 | 0.86 | 2 |
| E-21 | 12 | PP-1 | CA-6 | 0.20 | 0.62 | 0.59 | 0.96 | 2 |
| E-22 | 13 | PP-1 | CA-7 | 0.10 | 0.57 | 0.48 | 0.85 | 2 |
| E-23 | 14 | PP-1 | CA-7 | 0.20 | 0.60 | 0.55 | 0.93 | 2 |
| E-24 | 15 | PP-1 | CA-8 | 0.15 | 0.66 | 0.61 | 0.93 | 2 |

What is claimed is:

1. An electret web comprising:
   a thermoplastic resin; and
   a charge-enhancing additive comprising a substituted heterocyclic thiolate salt with the structure of Formula 3:

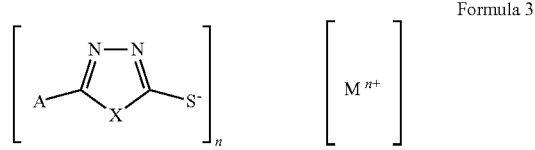

Formula 3 wherein X comprises an NH, N—NH$_2$, O, or S group; and
A comprises an aromatic or heterocyclic aromatic group of the general Formula 2:

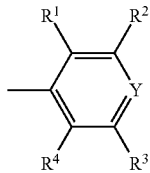

Formula 2 wherein $R^1$, $R^2$, $R^3$, and $R^4$ independently comprise a hydrogen atom, an alkyl, an aryl, an alkoxy, or a substituted alkyl; and Y is a C—$R^5$ group or a nitrogen atom, where $R^5$ is a hydrogen atom, an alkyl, an aryl, an alkoxy, or a substituted alkyl group.

2. The electret web of claim 1, wherein the web comprises a non-woven fibrous web.

3. The electret web of claim 1, wherein the web comprises a film.

4. The electret web of claim 1, wherein the charge-enhancing additive is a substituted heterocyclic thiolate salt of Formula 3:
wherein when n is 1, M=Li, Na, or K;
wherein when n is 2, M=Zn, Ca, or Mg;
wherein when n is 3, M=Al.

5. The electret web of claim 1, wherein the charge-enhancing additive is a substituted heterocyclic thiolate salt of Formula 3:
wherein the X is an NH group;
the groups $R^1$, $R^2$, $R^3$, and $R^4$ each is a hydrogen atom;
Y is a C—$R^5$ group, where $R^5$ is a hydrogen atom;
M is Zn; and
n is 2.

6. The electret web of claim 1, wherein the charge-enhancing additive is a substituted heterocyclic thiolate salt of Formula 3:
wherein the X is an O group;
the groups $R^1$, $R^2$, $R^3$, and $R^4$ each is a hydrogen atom;
Y is a C—$R^5$ group, where $R^5$ is an alkyl group;
M is Zn; and
n is 2.

7. The electret web of claim 1, wherein the charge-enhancing additive is a substituted heterocyclic thiolate salt of Formula 3:
wherein the X is an S group;
the groups $R^1$, $R^2$, $R^3$, and $R^4$ each is a hydrogen atom;
Y is a C—$R^5$ group, where $R^5$ is a hydrogen atom;
M is Zn; and
n is 2.

8. The electret web of claim 1 wherein the charge-enhancing additive comprises a salt of Formula 3A, Formula 3B, or Formula 3C:

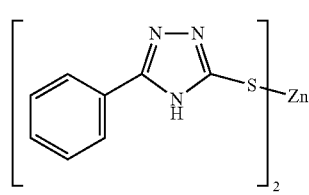

Formula 3A

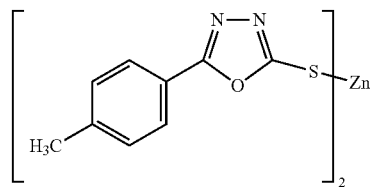

Formula 3B

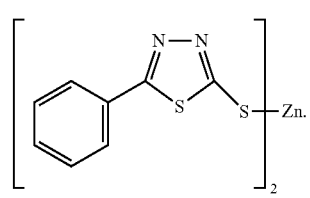

Formula 3C

9. An electret filter medium comprising:
a web comprising:
a thermoplastic resin; and
at least one charge-enhancing additive comprising a substituted heterocyclic thiolate salt with the general structure of Formula 3:

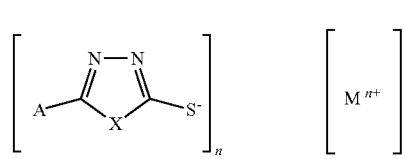

Formula 3 wherein X comprises an NH, N—NH$_2$, O, or S group; and
A comprises an aromatic or heterocyclic aromatic group of the general Formula 2:

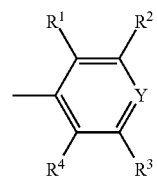

Formula 2 wherein $R^1$, $R^2$, $R^3$, and $R^4$ independently comprise a hydrogen atom, an alkyl, an aryl, an alkoxy, or a substituted alkyl; and Y is a C—$R^5$ group or a nitrogen atom, where $R^5$ is a hydrogen atom, an alkyl, an aryl, an alkoxy, or a substituted alkyl group.

10. The electret filter medium of claim 9, wherein the charge-enhancing additive is a substituted heterocyclic thiolate salt of Formula 3:
wherein when n is 1, M=Li, Na, or K;
wherein when n is 2, M=Zn, Ca, or Mg;
wherein when n is 3, M=Al.

11. The electret filter medium of claim 9, wherein the charge-enhancing additive is a substituted heterocyclic thiolate salt of Formula 3:
wherein the X is an NH group;
the groups $R^1$, $R^2$, $R^3$, and $R^4$ each is a hydrogen atom;
Y is a C—$R^5$ group, where $R^5$ is a hydrogen atom;
M is Zn; and
n is 2.

12. The electret filter media of claim 9, wherein the charge-enhancing additive is a substituted heterocyclic thiolate salt of Formula 3:
wherein the X is an O group;
the groups $R^1$, $R^2$, $R^3$, and $R^4$ each is a hydrogen atom;
Y is a C—$R^5$ group, where $R^5$ is an alkyl group;
M is Zn; and
n is 2.

13. The electret filter media of claim 9, wherein the charge-enhancing additive is a substituted heterocyclic thiolate salt of Formula 3:
wherein the X is an S group;
the groups $R^1$, $R^2$, $R^3$, and $R^4$ each is a hydrogen atom;
Y is a C—$R^5$ group, where $R^5$ is a hydrogen atom;
M is Zn; and
n is 2.

14. The electret filter media of claim 9, wherein the charge-enhancing additive comprises a salt of Formula 3A, Formula 3B, or Formula 3C:

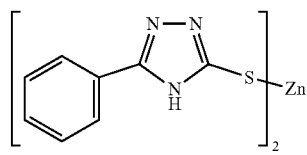

Formula 3A

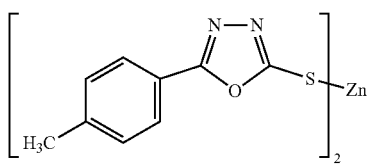

Formula 3B

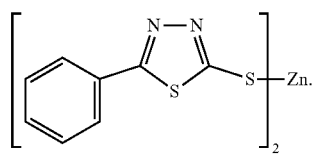

Formula 3C

15. The electret filter medium of claim 9, wherein the thermoplastic resin comprises:
polyolefin; polyvinyl chloride; polystyrene; polycarbonate; or polyester.

16. The electret filter medium of claim 9, wherein the charge-enhancing additive comprises 0.02-5.0% by weight of the web.

17. The electret filter medium of claim 9, wherein the web contains an electrostatic charge, wherein the charge is imparted through corona treatment, hydrocharging, or a combination thereof.

18. The electret filter medium of claim 9, wherein the web further comprises at least one additional additive selected from pigments, light stabilizers, nucleating agents, primary and secondary antioxidants, metal deactivators, hindered amines, hindered phenols, fatty acid metal salts, triester phosphites, phosphoric acid salts, fluorine-containing compounds and combinations thereof.

19. The electret filter medium of claim 9, wherein the filter medium retains at least 80% filtration performance as measured by Quality Factor after aging for 72 hours at 71° C.

* * * * *